United States Patent
DeMik et al.

(10) Patent No.: US 9,663,280 B2
(45) Date of Patent: *May 30, 2017

(54) BUNDLE SPACING DEVICE

(71) Applicant: Panduit Corp., Tinley Park, IL (US)

(72) Inventors: Jonathan A. DeMik, New Lenox, IL (US); Michael J. Vermeer, Cedar Lake, IN (US); Wu Wenli, Wuxi (CN)

(73) Assignee: Panduit Corp., Tinley Park, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/737,004

(22) Filed: Jun. 11, 2015

(65) Prior Publication Data
US 2015/0291326 A1    Oct. 15, 2015

Related U.S. Application Data

(63) Continuation of application No. 13/470,639, filed on May 14, 2012, now Pat. No. 9,067,717.

(30) Foreign Application Priority Data

Oct. 27, 2011  (CN) .......................... 2011 1 0355946
Oct. 27, 2011  (CN) .................... 2011 2 0431980 U

(51) Int. Cl.
*B65D 67/00*   (2006.01)
*B65D 67/02*   (2006.01)
(Continued)

(52) U.S. Cl.
CPC ............ *B65D 63/10* (2013.01); *B65D 67/02* (2013.01); *F16B 7/0433* (2013.01); *F16L 3/137* (2013.01);
(Continued)

(58) Field of Classification Search
CPC ... F16B 7/0433; B65D 67/02; B65D 63/1027; F16L 3/137; F16L 3/211; F16L 3/237;
(Continued)

(56) References Cited

U.S. PATENT DOCUMENTS 2,273,136 A   2/1942   Orech et al.
2,313,280 A   3/1943   Szego
(Continued)

FOREIGN PATENT DOCUMENTS

DE   19820651 A1   11/1999
EP   1921362 B1   7/2010

*Primary Examiner* — Robert J Sandy
(74) *Attorney, Agent, or Firm* — Christopher S. Clancy; James H. Williams; Aimee E. McVady

(57) ABSTRACT

A bundle spacing device having a first pair of opposing surfaces spaced apart from each other a first distance and a second pair of opposing surfaces spaced apart from each other a second distance, different than the first distance, and generally perpendicular to the first pair of opposing surfaces. The bundle spacing device is configured such that bundles can be coupled to the bundle spacing device in a first position or a second position. The bundle spacing device can also have a first passage extending along a first axis, a second passage extending along a second axis that is perpendicular to the first axis, and a third passage extending along a third axis that is perpendicular to the first axis and parallel to the second axis.

9 Claims, 16 Drawing Sheets

(51) Int. Cl.
  *B65D 63/10* (2006.01)
  *F16B 7/04* (2006.01)
  *F16L 3/237* (2006.01)
  *F16L 3/137* (2006.01)
  *F16L 3/22* (2006.01)

(52) U.S. Cl.
  CPC ............... *F16L 3/221* (2013.01); *F16L 3/237* (2013.01); *B65D 63/1027* (2013.01); *B65D 2563/108* (2013.01); *Y10T 24/141* (2015.01); *Y10T 24/1402* (2015.01); *Y10T 24/1498* (2015.01); *Y10T 24/3444* (2015.01); *Y10T 403/348* (2015.01); *Y10T 403/7129* (2015.01); *Y10T 403/7141* (2015.01); *Y10T 403/7147* (2015.01)

(58) Field of Classification Search
  CPC ............... Y10T 24/141; Y10T 24/1498; Y10T 24/3444; Y10T 403/348; Y10T 403/7129; Y10T 403/7141; Y10T 403/7147
  USPC ........... 24/17 AP, 16 PB, 339, 129 A, 129 R; 403/177, 346, 385, 389, 390, 391, 392, 403/395, 396; 248/74.3
  See application file for complete search history.

(56) References Cited

U.S. PATENT DOCUMENTS

| | | | |
|---|---|---|---|
| 3,204,305 A | 9/1965 | Deex | |
| 3,250,505 A | 5/1966 | Rodman, Sr. et al. | |
| 3,486,725 A | 12/1969 | Hidassy | |
| 3,632,071 A | 1/1972 | Cameron et al. | |
| 3,668,744 A | 6/1972 | Moody et al. | |
| 4,397,435 A | 8/1983 | Fisher et al. | |
| 4,440,519 A * | 4/1984 | Pennel | F16B 7/0493 403/399 |
| 4,562,982 A | 1/1986 | McSherry et al. | |
| 4,872,240 A | 10/1989 | Spinner et al. | |
| 4,899,963 A | 2/1990 | Murphy | |
| 4,909,051 A | 3/1990 | Lee | |
| 4,993,669 A | 2/1991 | Dyer | |
| 5,083,346 A | 1/1992 | Orton | |
| 5,279,485 A | 1/1994 | Georges | |
| D357,171 S | 4/1995 | Studdiford | |
| 5,538,208 A | 7/1996 | Cordes et al. | |
| 5,598,995 A | 2/1997 | Meuth et al. | |
| D379,424 S | 5/1997 | White, Jr. et al. | |
| 5,697,591 A * | 12/1997 | Cooper | F21V 21/08 403/391 |
| D399,414 S | 10/1998 | Viklund | |
| 5,950,284 A | 9/1999 | Persson | |
| 5,954,302 A | 9/1999 | Robertson et al. | |
| 6,129,317 A | 10/2000 | Rodrigues et al. | |
| 6,196,751 B1 | 3/2001 | Khokhar | |
| 6,561,473 B1 | 5/2003 | Ianello | |
| D543,835 S | 6/2007 | Geiger | |
| 7,278,613 B2 | 10/2007 | Roy | |
| 7,861,981 B2 | 1/2011 | Olver | |
| 8,559,782 B2 | 10/2013 | Cleofe et al. | |
| 2002/0071715 A1 | 6/2002 | Geiger | |
| 2003/0222184 A1 | 12/2003 | Geiger | |
| 2006/0248844 A1* | 11/2006 | Kodi | E04C 5/163 52/712 |
| 2010/0096511 A1 | 4/2010 | Olver | |
| 2015/0152640 A1* | 6/2015 | Kodi | E04C 5/163 52/686 |

* cited by examiner

BUNDLE SPACING DEVICE

CROSS-REFERENCE TO RELATED APPLICATIONS

This application is a continuation of U.S. patent application Ser. No. 13/470,639, filed May 14, 2012; which claims priority to Chinese Patent Application No. 201110355946.6, filed Oct. 27, 2011 and Chinese Patent Application No. 201120431980.2, filed Oct. 27, 2011, which issued as Chinese Patent No. 201120431980.2 on Jan. 16, 2013, the subject matter of which is hereby incorporated by reference in its entirety.

FIELD OF INVENTION

The present invention generally relates to bundle spacing devices and, more particularly, to bundle spacing devices usable in multiple orientations and multiple environments.

BACKGROUND

Bundle spacing devices are generally disposed between two separate bundles in order to space the bundles apart from one another. A bundle can be one or more than one wire, cable, hose, pipe or anything generally cylindrical in shape. Connection members are used to couple the bundles to the bundle spacing device.

In use, bundles may run parallel to each other or may run perpendicular to each other. Conventional bundle spacing devices may couple to the bundles in only one orientation and may accommodate only one configuration. That is, the bundle spacing device may accommodate bundles running parallel to each other or the bundle spacing device may accommodate bundles running perpendicular to each other, but not both. A first type of bundle spacing device may be required to accommodate bundles running parallel to each other and a second type of bundle spacing device, different than the first type, may be required to accommodate bundles running perpendicular to each other.

Normally, bundles are fixed by a series of fixtures (including cable ties and bases). However, sometimes, in order to protect the bundles from abrasion and damage, it is necessary to separate the bundles with a certain distance and to arrange them in a parallel or perpendicular orientation. With current technology, it is a common practice to use insulating tapes to separate the bundles which increases the workload and decreases the efficiency. In order to solve the problems mentioned above, a fixing device is needed to facilitate the separation of all types of bundles.

Therefore, there is a need for a single bundle spacing device capable of spacing bundles in a variety of different environments, at a variety of different orientations, and at a variety of different distances.

SUMMARY OF THE INVENTION

In one example, a bundle spacing device comprises a first pair of opposing surfaces spaced apart from each other a first distance and a second pair of opposing surfaces spaced apart from each other a second distance, different than the first distance, and generally perpendicular to the first pair of opposing surfaces. The bundle spacing device is configured such that bundles can be coupled to the bundle spacing device in a first position or a second position. In the first position the first pair of opposing surfaces engage the bundles to space the bundles apart at the first distance. In the second position the second pair of opposing surfaces engage the bundles to space the bundles apart at the second distance.

In another example, a bundle spacing device, comprises a first passage extending along a first axis, a second passage extending along a second axis that is perpendicular to the first axis, and a third passage extending along a third axis that is perpendicular to the first axis and parallel to the second axis. The first, second, and third passages are each configured to receive a connection member.

In a further example, a bundle spacing device comprises a first wall, a second wall, and a plurality of spaced apart members extending between and engaging the first and second walls. The second wall is spaced apart from and generally perpendicular to the first wall. The first and second walls and the plurality of members define a passage through the bundle spacing device that is configured to receive a connection member and at least two of the plurality of spaced apart members engage the connection member and impart frictional resistance to the connection member.

Figure 1:
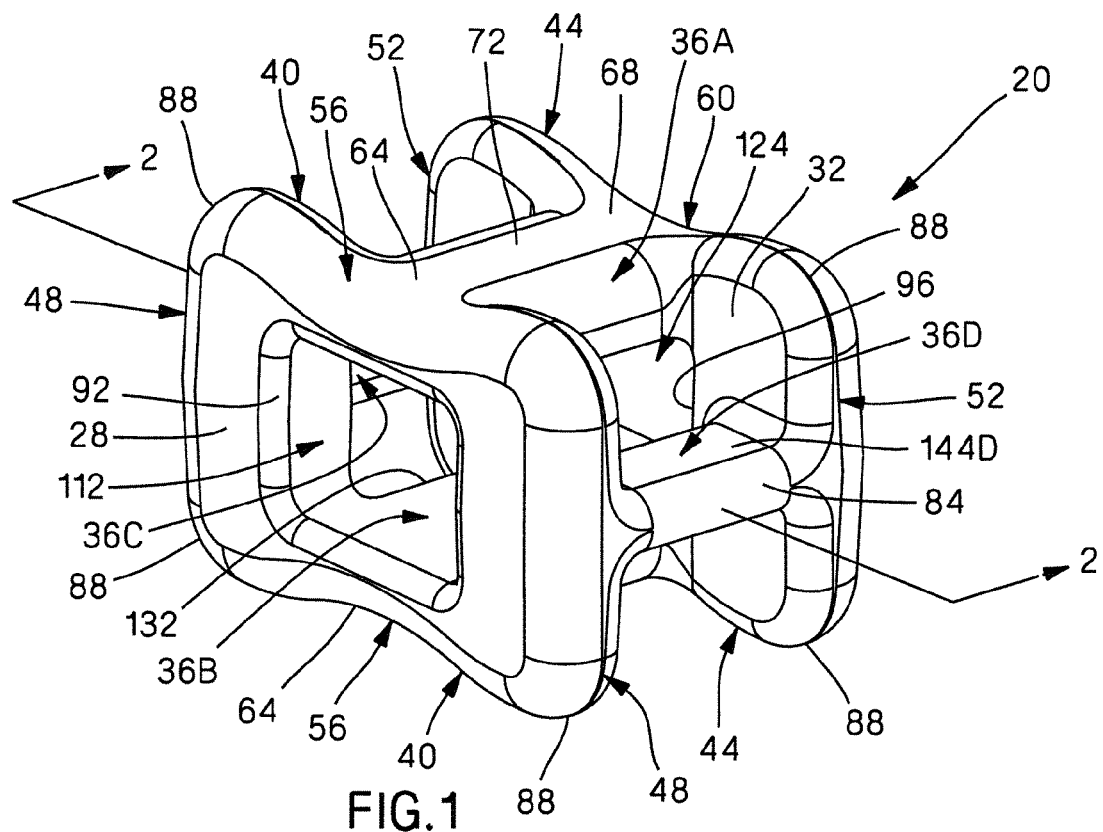
FIG. 1 is a top front perspective view of an exemplary bundle spacing device.
Figure 2:
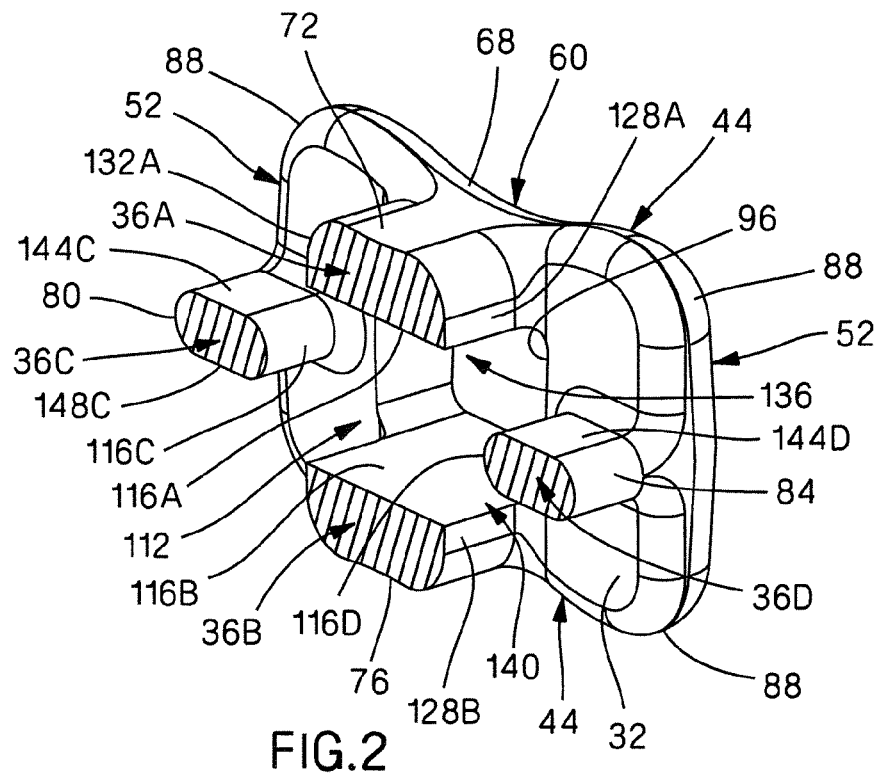
FIG. 2 is a cross-sectional view taken along line 2-2 in FIG. 1.

Before any independent features and embodiments of the invention are explained in detail, it is to be understood that the invention is not limited in its application to the details of the construction and the arrangement of the components set forth in the following description or illustrated in the drawings. The invention is capable of other embodiments and of being practiced or of being carried out in various ways. Also, it is understood that the phraseology and terminology used herein is for the purpose of description and should not be regarded as limiting.

DETAILED DESCRIPTION

With reference to FIGS. 1-5, an exemplary bundle spacing device 20 is illustrated. The bundle spacing device 20 may be positioned between bundles 24 in order to space the bundles 24 apart from one another. The bundle spacing device 20 is capable of spacing apart bundles (i.e., one bundle on a first side of the bundle spacing device and a second bundle on an opposite side of the bundle spacing device). Hereinafter, the description will refer to and the figures will illustrate bundles rather than an individual bundle. However, as indicated above, it should be understood that the bundle spacing device is capable of spacing apart any number of bundles and reference to and illustration of bundles is not intended to be limiting upon the present invention.

With continued reference to FIGS. 1-5, the bundle spacing device 20 includes a first wall 28, a second wall 32 spaced apart from the first wall 28, and a plurality of members 36A-36D extending between the first and second walls 28, 32. In the illustrated exemplary embodiment, the bundle spacing device 20 is a one-piece unitarily formed component and is made of a suitable grade of thermoplastic material.

Returning to the illustrated exemplary embodiment, each of the first and second walls 28, 32 includes a pair of opposing elongate edges 40, 44 and a pair of opposing short edges 48, 52. In the illustrated exemplary embodiment, the opposing elongate edges 40, 44 of the first and second walls 28, 32 include a convex arcuate portion 56, 60. Bottoms 64, 68 of the convex arcuate portions 56, 60 are substantially and respectively aligned with outer surfaces 72, 76 of the adjacent members 36A, 36B extending between the first and second walls 28, 32. That is, as shown in FIGS. 1-5, bottoms 64, 68 of the top arcuate portions 56, 60 are aligned with the outer surface 72 of the member 36A extending between tops of the first and second walls 28, 32. In addition, as shown in FIGS. 1-5, bottoms 64, 68 of the bottom arcuate portions 56, 60 are aligned with an outer surface 76 of the member 36B extending between bottoms of the first and second walls 28, 32.

In the illustrated exemplary embodiment, the opposing short edges 48, 52 of the first and second walls 28, 32 are substantially straight and are substantially aligned with outer surfaces 80, 84 of the adjacent member 36C, 36D extending between the first and second walls 28, 32. That is, as shown in FIGS. 1-5, the right short edges 48, 52 of the first and second walls 28, 32 are aligned with the outer surface 80 of the right member 36C extending between right sides of the first and second walls 28, 32. In addition, as shown in FIGS. 1-5, the left short edges 48, 52 of the first and second walls 28, 32 are aligned with the outer surface 84 of the left member 36D extending between left sides of the first and second walls 28, 32.

With continued reference to FIGS. 1-5, all corners where surfaces of the bundle spacing device 20 intersect are rounded to eliminate sharp corners or points that may engage bundles, possibly resulting in the damage or cutting of the bundles. For example, the bundle spacing device 20 includes rounded corners 88 transitioning between the elongate edges 40, 44 and the short edges 48, 52 of the first and second walls 28, 32. Similarly, edges of the members 36A-36D extending between the first and second walls 28, 32 may be rounded. It should also be understood that any surface of the bundle spacing device 20 engageable by bundles may have rounded edges or rounded surfaces to eliminate sharp corners and edges that may damage the bundles.

Figure 4:
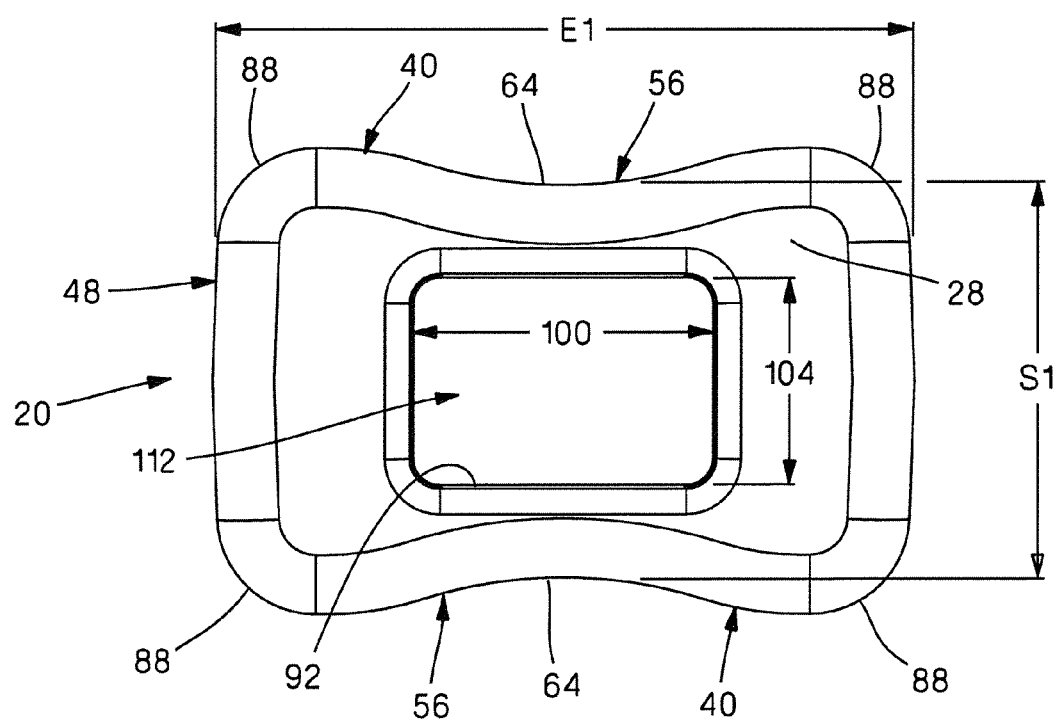
FIG. 4 is a front view of the bundle spacing device shown in FIG. 1.

As illustrated in FIG. 4, the exemplary bundle spacing device 20 has a first or elongate dimension E1 and a second or short dimension S1. The elongate and short dimensions E1, S1 may be any dimension desired, as long as the elongate dimension E1 is longer than the short dimension S1. The elongate dimension E1 may be measured at the widest possible point of the bundle spacing device 20 while the short dimension S1 may be measured from bottoms 64, 68 of the arcuate portions 56, 60 of the elongate edges 40, 44. For example, the elongate dimension E1 may be about 0.5 inches and the short dimension S1 may be about 0.25 inches. In this example, the elongate and short dimensions E1, S1 are selected to coincide with bundle spacing regulations in aeronautical environments. Such regulations are suspect to change and, therefore, the dimensions E1, S1 of the bundle spacing device 20 may also change to maintain compliance with bundle spacing regulations. In addition, the bundle spacing device 20 may have any dimensions to comply with bundle spacing regulations of any environment.

A first aperture 92 is defined in the first wall 28 and a second aperture 96 is defined in the second wall 32. The first aperture 92 and the second aperture 96 are generally rectangular in shape, may be substantially the same size, and may be aligned with each other. The first and second apertures 92, 96 include a first dimension 100 and a second dimension 104 (see FIG. 4) with the first dimension 100 larger than the second dimension 104. Alternatively, the apertures 92, 96 may have configurations other than rectangular such as, for example, other polygonal shapes, or any fully or partially arcuately perimetered shape.

A plurality of passages are defined through the bundle spacing device 20 that are adapted to receive connection members 108 therethrough. A first passage 112 is defined through the bundle spacing device 20 from the first wall 28 through to the second wall 32 and extends substantially perpendicular to the first and second walls 28, 32 and substantially parallel to the members 36A-36D. The first passage 112 is defined generally by the first and second apertures 92, 96 and inner surfaces 116A-116D of the members 36A-36D. As can best be seen in FIG. 3, second and third passages 120, 124 are defined through the bundle spacing device 20 in a direction extending substantially parallel with the short edges 48, 52. As illustrated in FIGS. 1-5, the second and third passages 120, 124 are respectively comprised of inner surfaces 116C, 116D of right and left members 36C, 36D, left and right surfaces 128A, 128B, 132A, 132B of top and bottom members 36A, 36B, and the inner surfaces of first and second walls 28, 32. As can best be seen in FIG. 5, fourth and fifth passages 136, 140 are defined through the bundle spacing device 20 in a direction extending substantially parallel with the elongate edges 40, 44 of the bundle spacing device 20. As illustrated in FIGS. 1-5, the fourth and fifth passages 136, 140 are respectively comprised of inner surfaces 116A, 116B of top and bottom members 36A, 36B, top and bottom surfaces 144C, 144D, 148C, 148D of right and left members 36C, 36D, and the inner surfaces of first and second walls 28, 32.

Figure 5:
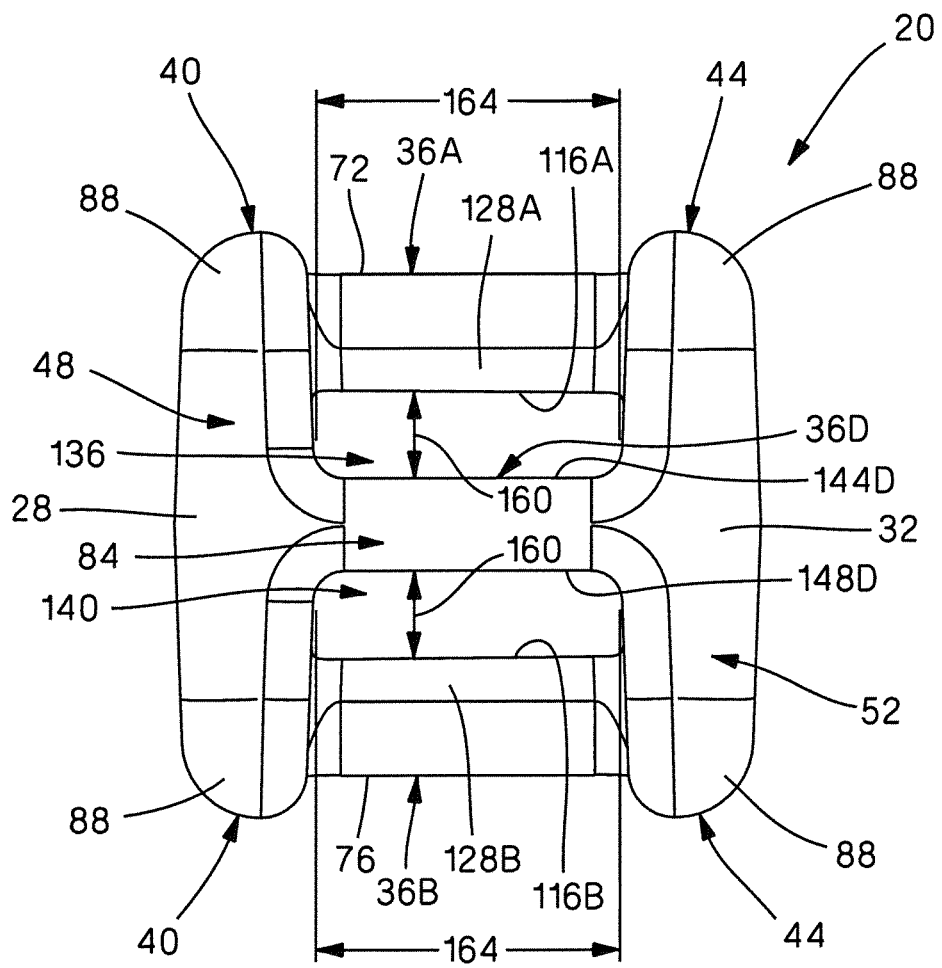
FIG. 5 is a left side view of the bundle spacing device shown in FIG. 1.
Figure 6:
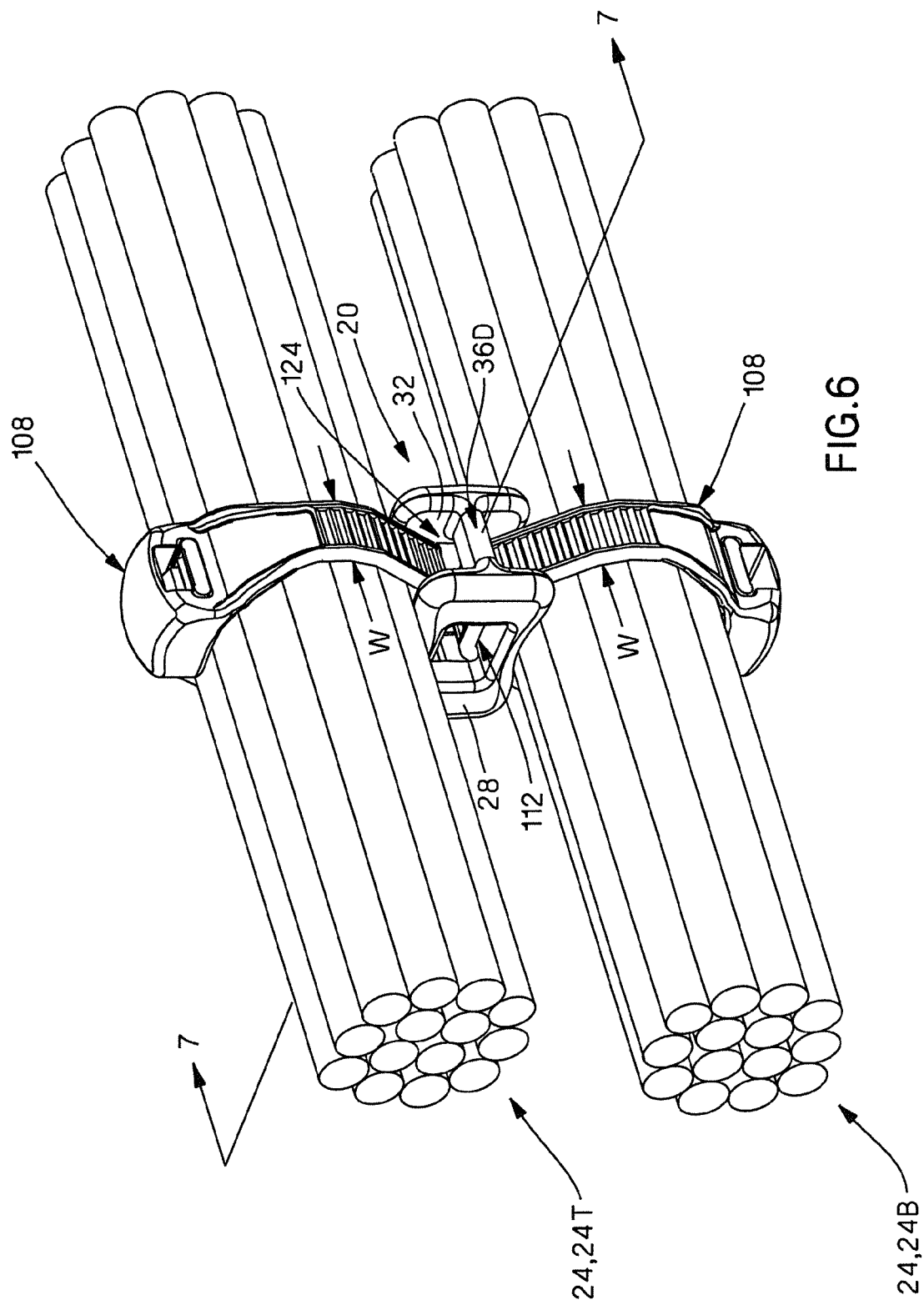
FIG. 6 is a top front perspective view of the bundle spacing device shown in FIG. 1 in a first orientation with a pair of connection members and a pair of bundles.

With continued reference to FIGS. 1-5 and additional reference to FIG. 6, connection members 108 may be used with the bundle spacing device 20 to couple bundles 24 to the bundle spacing device 20. A variety of different types of connection members 108 may be used. In the illustrated exemplary embodiment, the connection members are cable ties 108. The illustrated exemplary embodiment of cable ties is not intended to be limiting upon the present invention and other types of connection members may be used with the bundle spacing device and be within the spirit and scope of the present invention. The illustrated cable ties are conventional cable ties and include a width W (see FIG. 6) and a thickness T (see FIG. 7).

In the illustrated exemplary embodiment, the first passage 112 of the bundle spacing device 20 is adapted to allow insertion of a connection member 108 in a first orientation and to restrict insertion of a connection member 108 in a second orientation. The first and second dimensions 100, 104 of the first passage 112 facilitate this allowance of insertion in the first orientation and restriction of insertion in the second orientation. More particularly and with reference to the illustrated exemplary embodiment, the first dimension 100 is equal to or larger than a width W of a connection member 108, such as the illustrated cable tie, to allow insertion of the connection member 108 through the first passage 112 and allow the connection member 108 to lay flat against an inner surface of the first passage 112 having the first dimension 100. The second dimension 104 of the first passage 112 is smaller than the width of a connection member 108, such as the illustrated cable tie, to restrict the connection member 108 from laying flat against an inner surface of the first passage 112 having the second dimension 104. The purpose of this restriction will be described in more detail below.

It should be understood that the first passage 112 may have a variety of different shapes and sizes, and such variety of shapes and sizes are preferably capable of allowing coupling of a connection member 108 to the bundle spacing device 20 in one orientation and restricting coupling of the connection member 108 to the bundle spacing device 20 in a second orientation.

Figure 3:
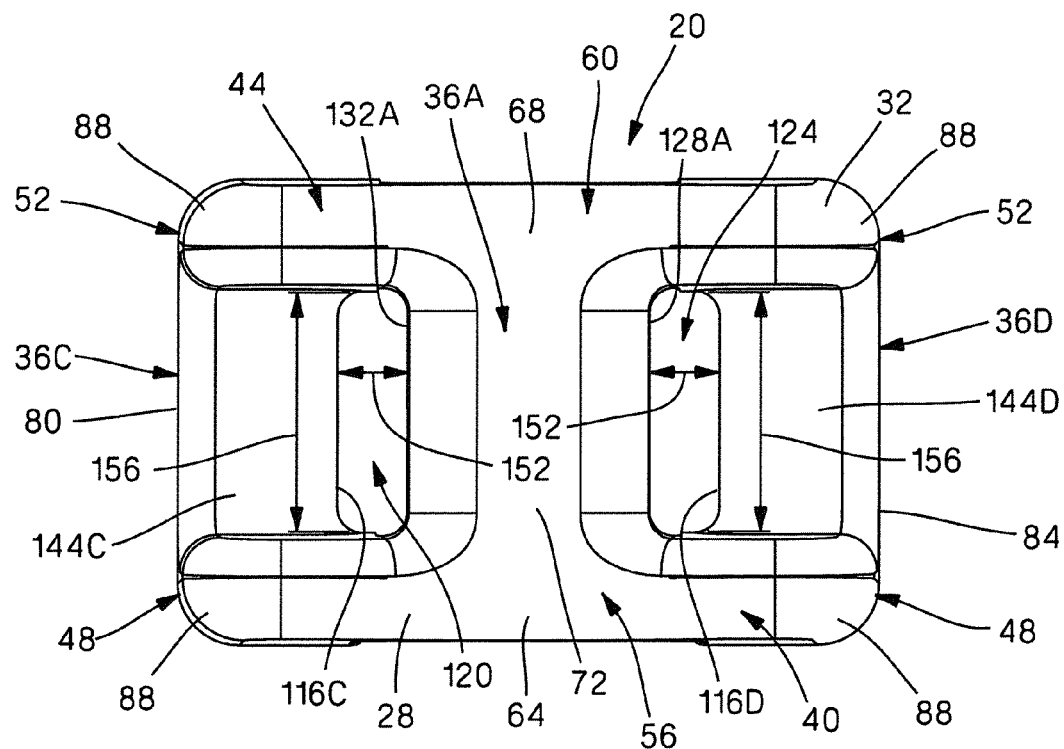
FIG. 3 is a top view of the bundle spacing device shown in FIG. 1.

With continued reference to FIGS. 1-5, the illustrated exemplary embodiments of the second and third passages 120, 124 each have a first dimension 152 respectively defined between inner surfaces 116C, 116D of right and left members 36C, 36D and left and right surfaces 128A, 128B, 132A, 132B of top and bottom members 36A, 36B. FIG. 3 best illustrates the first dimension 152 of the second and third passages 120, 124 as seen from above. In the illustrated exemplary embodiment, the second and third passages 120, 124 have the same first dimension 152, but could have different first dimensions as required by a particular application. In the illustrated exemplary embodiment, the first dimension 152 of the second and third passages 120, 124 is smaller than the thickness T of a connection member 108, such as the illustrated cable tie. The smaller first dimension 152 of the second and third passages 120, 124 prevents the connection member 108 from passing straight through the second and third passages 120, 124, and instead causes the connection member 108 to bend through the second and third passages 120, 124, thereby applying friction to the connection member 108 by the members 36A-36D. This allows a connection member 108 to be preinstalled in the second and third passages 120, 124 and the bundle spacing device 20 to be maneuvered into position without the connection member 108 falling out of the bundle spacing device 20. This allows easier installation of the exemplary bundle spacing device 20.

The second and third passages 120, 124 also include a second dimension 156 that is at least the same as the width W of the connection member 108, but could be larger than the width W of the connection member 108, to allow the connection member 108 to pass through the second and third passages 120, 124 with little resistant from the sides of the second and third passages 120, 124. In the illustrated exemplary embodiment, the second dimensions 156 for the second and third passages 120, 124 are the same, but could be different as required by a particular application, as long as both second dimensions 156 are at least the same as the width W of the connection member 108.

In the illustrated exemplary embodiment, the first and second dimensions 152, 156 of the second and third passages 120, 124 together facilitate insertion of only a single connection member 108. This feature is beneficial for a variety of reasons such as, for example, it may inhibit a user from incorrectly coupling bundles 24 to the bundle spacing device 20 by inserting multiple connection members through the same passage.

During set up of the bundle spacing device 20 and prior to installation of the bundles 24, a user may desire to insert connection members 108 through the second and third passages 120, 124 in order to prepare the bundle spacing device 20 and connection members 108 for installation. In order for the connection members 108 to remain within the second and third passages 120, 124 prior to use, sufficient friction must be exerted on the connection members 108. Without sufficient friction, the connection members 108 would simply slide out of the second and third passages 120, 124 and fall from the bundle spacing device 20. Thus, the members 36A-36D apply sufficient friction to the connection members 108 to retain them in the second and third passages 120, 124 prior to installation.

The fourth and fifth passages 136, 140 may be configured in a similar manner to the second and third passages 120, 124 for similar reasons. That is, the fourth and fifth passages 136, 140 may have a first dimension 160 respectively defined between inner surfaces 116A, 116B, of top and bottom members 36A, 36B and top and bottom surfaces 144C, 144D, 148C, 144D of right and left members 36C, 36D. FIG. 5 best illustrates the first dimension 160 of the fourth and fifth passages 136, 140 as seen from the side. In the illustrated exemplary embodiment, the fourth and fifth passages 136, 140 have the same first dimension 160, but could have different first dimensions as required by any particular application. The first dimension 160 of the fourth and fifth passages 136, 140 is smaller than the thickness T of a connection member 108, such as the illustrated cable tie. The smaller first dimension 160 of the fourth and fifth passages 136, 140 prevents the connection member 108 from passing straight through the fourth and fifth passages 136, 140 with little friction applied to the connection member 108 by the members 36A-36D, and instead causes the connection member 108 to bend through the fourth and fifth passages 136, 140, thereby applying friction to the connection member 108 by the members 36A-36D. This allows a connection member 108 to be preinstalled in fourth and fifth passages 136, 140 and the bundle spacing device 20 to be maneuvered into position without the connection member 108 falling out of the bundle spacing device 20. This allows easier installation of the exemplary bundle spacing device 20.

The fourth and fifth passages 136, 140 also include a second dimension 164 that is at least the same as the width W of the connection member 108, but could be larger than the width W of the connection member 108, to allow the connection member 108 to pass through the fourth and fifth passages 136, 140 with little resistant from the sides of the fourth and fifth passages 136, 140. In the illustrated exemplary embodiment, the second dimensions 164 for the fourth and fifth passages 136, 140 are the same, but could be different as required by a particular application, as long as both second dimensions 164 are at least the same as the width W of the connection member 108.

In the illustrated exemplary embodiment, the first and second dimensions 160, 164 of the fourth and fifth passages 136, 140 together facilitate insertion of only a single connection member 108. This feature is beneficial for a variety of reasons such as, for example, it may inhibit a user from incorrectly coupling bundles 24 to the bundle spacing device 20 by inserting multiple connection members 108 through the same passage.

Figure 7:
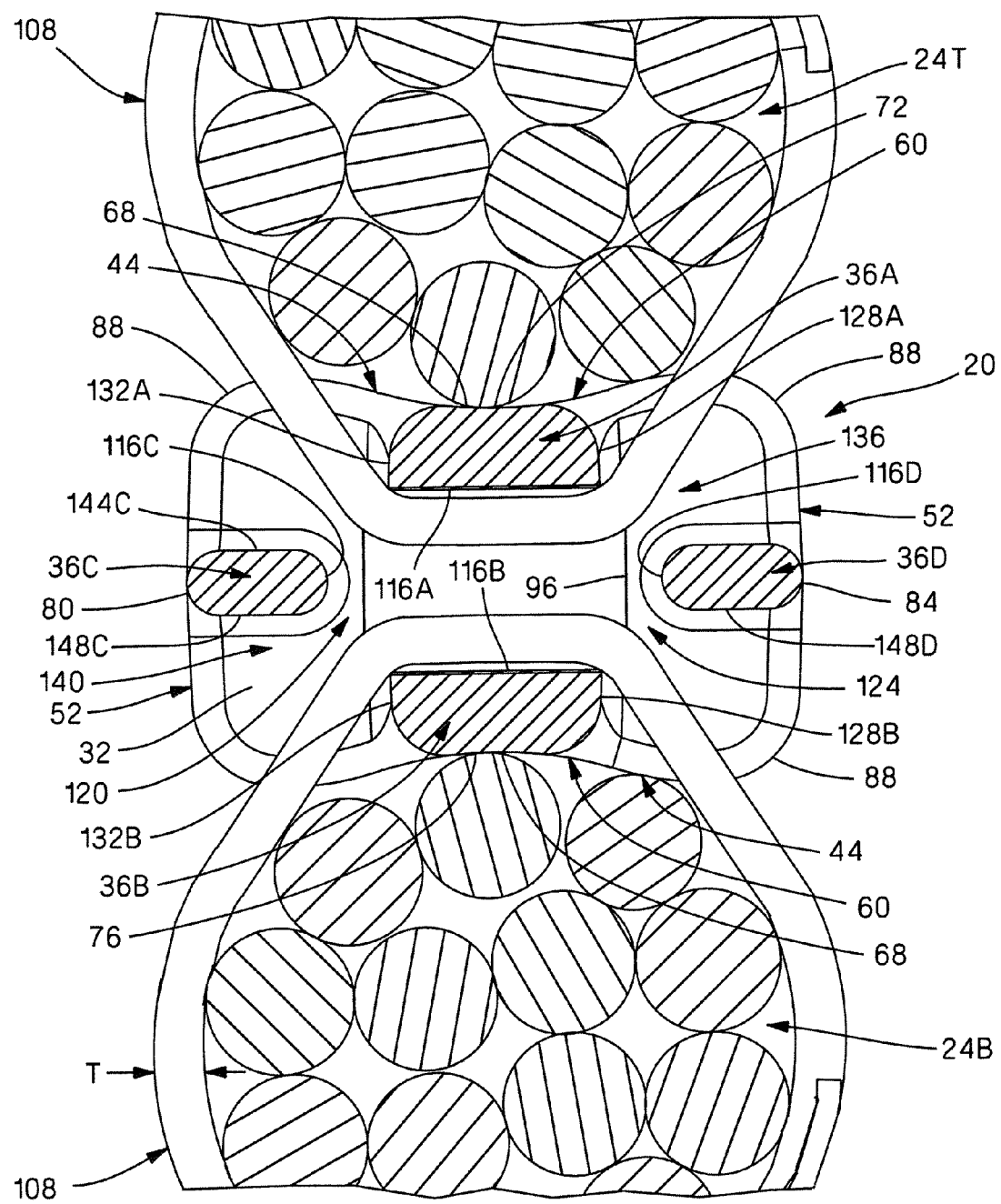
FIG. 7 is a cross-sectional view taken along line 7-7 in FIG. 6.

Referring now to FIGS. 6 and 7, the bundle spacing device 20 is illustrated in a first orientation. In this first orientation, the bundle spacing device 20 is positioned with its elongate dimension E1 perpendicular to a pair of parallel running bundles 24. The top bundle 24T is positioned within and engages the top arcuate portions 56, 60 of the first and second walls 28, 32 and an outer surface 72 of member 36A extending between the first and second walls 28, 32. The top connection member 108 wraps around the top bundle 24T and inserts through the fourth passage 136 of the bundle spacing device 20 to couple the top bundle 24T to the bundle spacing device 20. The bottom bundle 24B is positioned within and engages the bottom arcuate portions 56, 60 of the first and second walls 28, 32 and an outer surface 76 of member 36B extending between the first and second walls 28, 32. The bottom connection member 108 wraps around the bottom bundle 24B and inserts through the fifth passage 140 of the bundle spacing device 20 to couple the bottom bundle 24B to the bundle spacing device 20.

The top and bottom arcuate portions 56, 60 of the first and second walls 28, 32 act as saddles to assist with coupling of the bundles 24 to bundle spacing device 20. More particularly, the top and bottom arcuate portions 56, 60 help retain the bundles 24 in contact with the elongate edges 40, 44 of the bundle spacing device 20 by resisting sliding or moving of the bundles 24 along the elongate edges 40, 44 of the bundle spacing device 20 toward and off of sides of the bundle spacing device 20.

When the bundles 24 are tightly coupled to the bundle spacing device 20 in this first orientation, the parallel running bundles 24 are spaced apart from each other at the second or short dimension S1 of the bundle spacing device 20. Referring back to the example provided above, in this first orientation, the bundles 24 would be spaced apart from each other about 0.25 inches.

Figure 8:
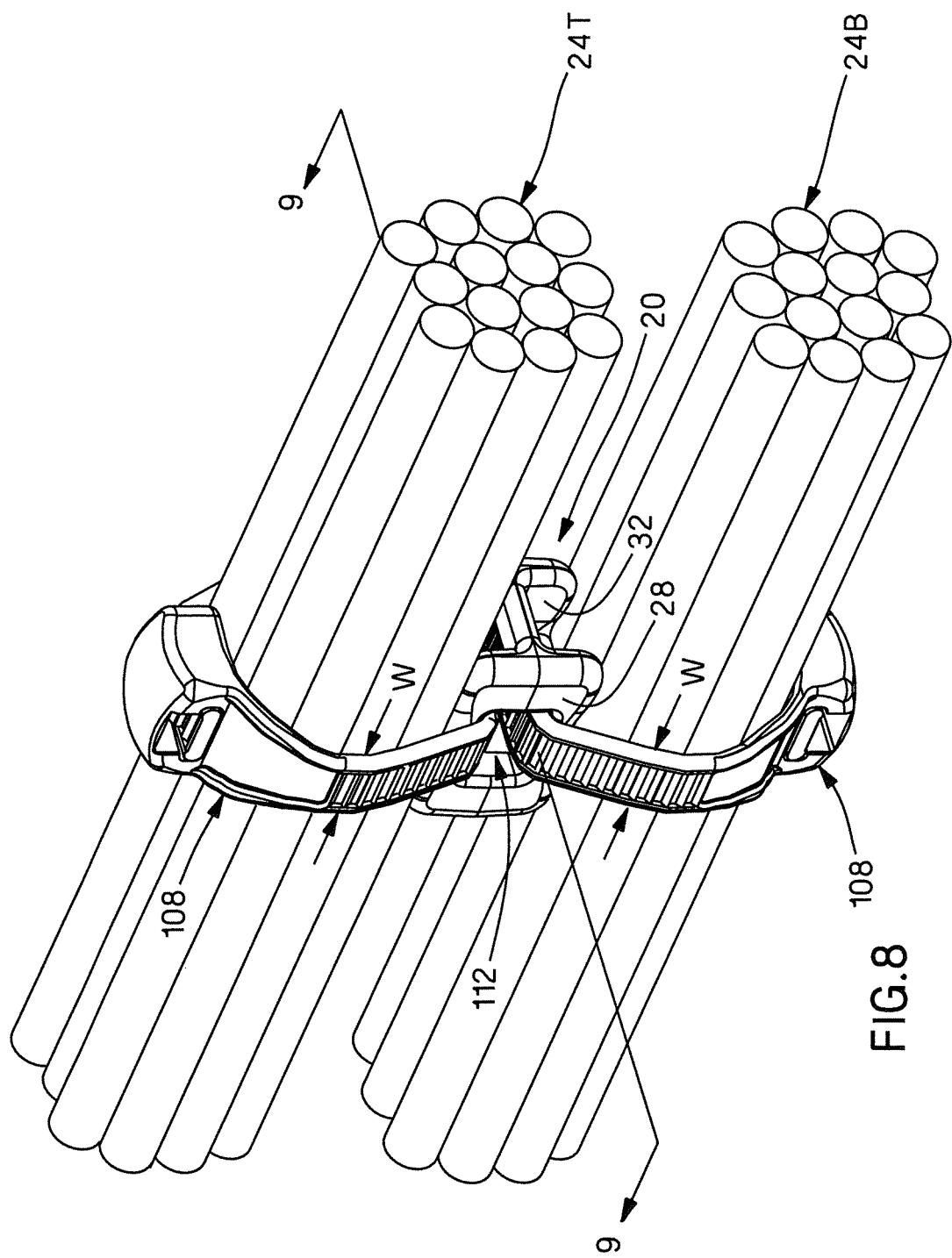
FIG. 8 is a top front perspective view of the bundle spacing device shown in FIG. 1 in a second orientation with a pair of connection members and a pair of bundles.
Figure 9:
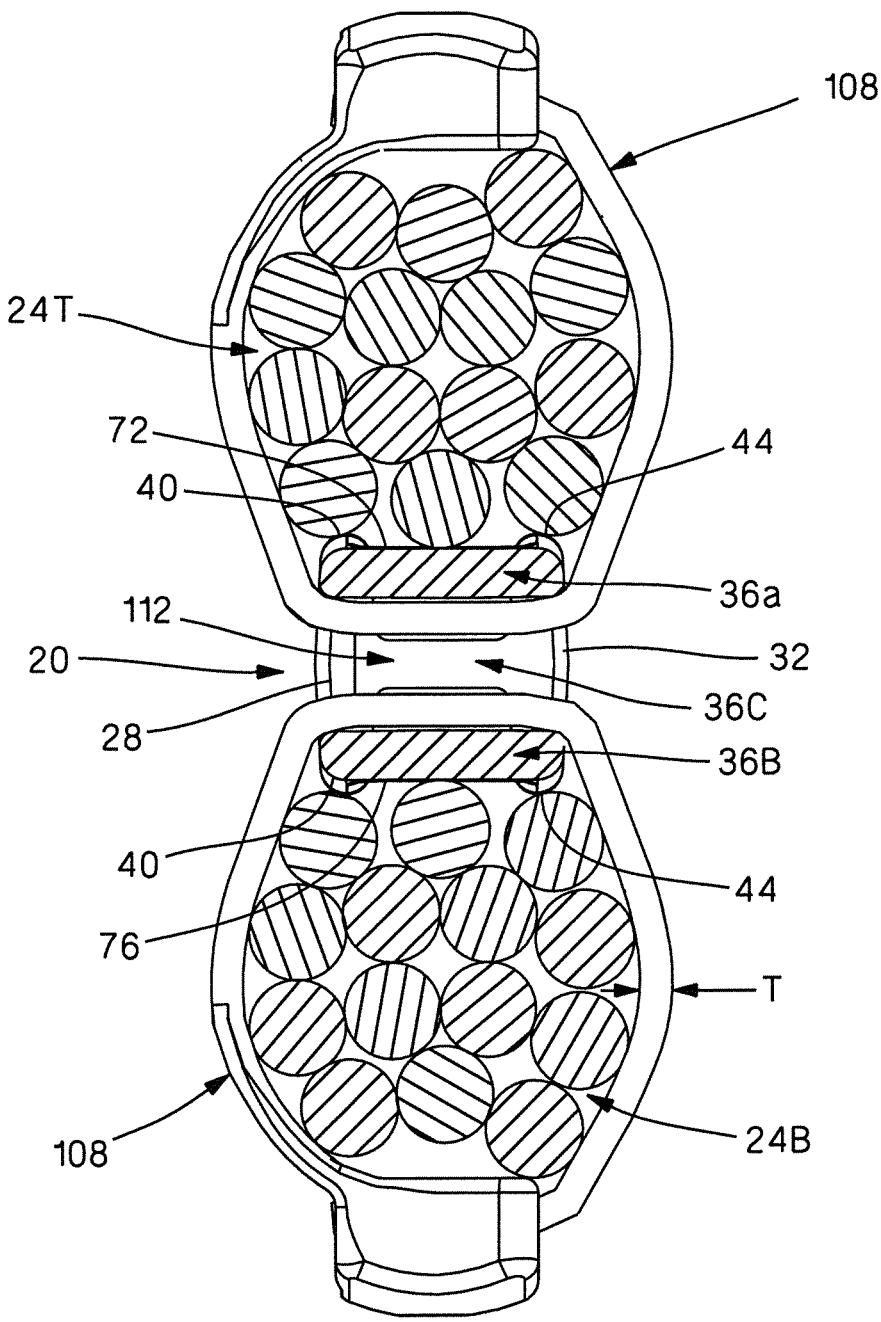
FIG. 9 is a cross-sectional view taken along line 9-9 in FIG. 8.

Referring now to FIGS. 8 and 9, the bundle spacing device 20 is illustrated in a second orientation. In this second orientation, the bundle spacing device 20 is positioned with its elongate dimension E1 parallel to a pair of parallel running bundles 24. The top bundle 24T has a portion thereof positioned between first and second walls 28, 32 and engages the outer surface 72 of member 36A extending between the first and second walls 28, 32. As best seen in FIG. 9, the highest portions of the first and second walls 28, 32 extend above the outer surface 72 of member 36A extending between the first and second walls 28, 32. This difference in height provides a kind of saddle in which a portion of the top bundle 24T may be positioned and such a saddle inhibits the top bundle 24T from sliding or moving off of the top of the bundle spacing device 20. The top connection member 108 wraps around the top bundle 24T and inserts through the first passage 112 of the bundle spacing device 20 to couple the top bundle 24T to the bundle spacing device 20. As indicated above, the first dimension 100 of the first passage 112 is sufficiently wide to allow the top connection member 108 to lie flat against an inside of the first passage 112. The bottom bundle 24B has a portion thereof positioned between first and second walls 28, 32 and engages the outer surface 76 of member 36B extending between the first and second walls 28, 32. As best seen in FIG. 9, the lowest portions of the first and second walls 28, 32 extend below the outer surface 76 of member 36B extending between the first and second walls 28, 32. This difference in height provides a kind of saddle in which a portion of the bottom bundle 24B may be positioned and such a saddle inhibits the bottom bundle 24B from sliding or moving off of the bottom of the bundle spacing device 20. The bottom connection member 108 wraps around the bottom bundle 24B and inserts through the first passage 112 of the bundle spacing device 20 to couple the bottom bundle 24B to the bundle spacing device 20. As indicated above, the first dimension 100 of the first passage 112 is sufficiently wide to allow the bottom connection member 108 to lie flat against an inside of the first passage 112.

When the bundles 24 are tightly coupled to the bundle spacing device 20 in this second orientation, the parallel running bundles 24 are spaced apart from each other at the second or short dimension S1 of the bundle spacing device 20. Referring back to the example provided above, in this second orientation, the bundles 24 would be spaced apart from each other about 0.25 inches.

Figure 10:
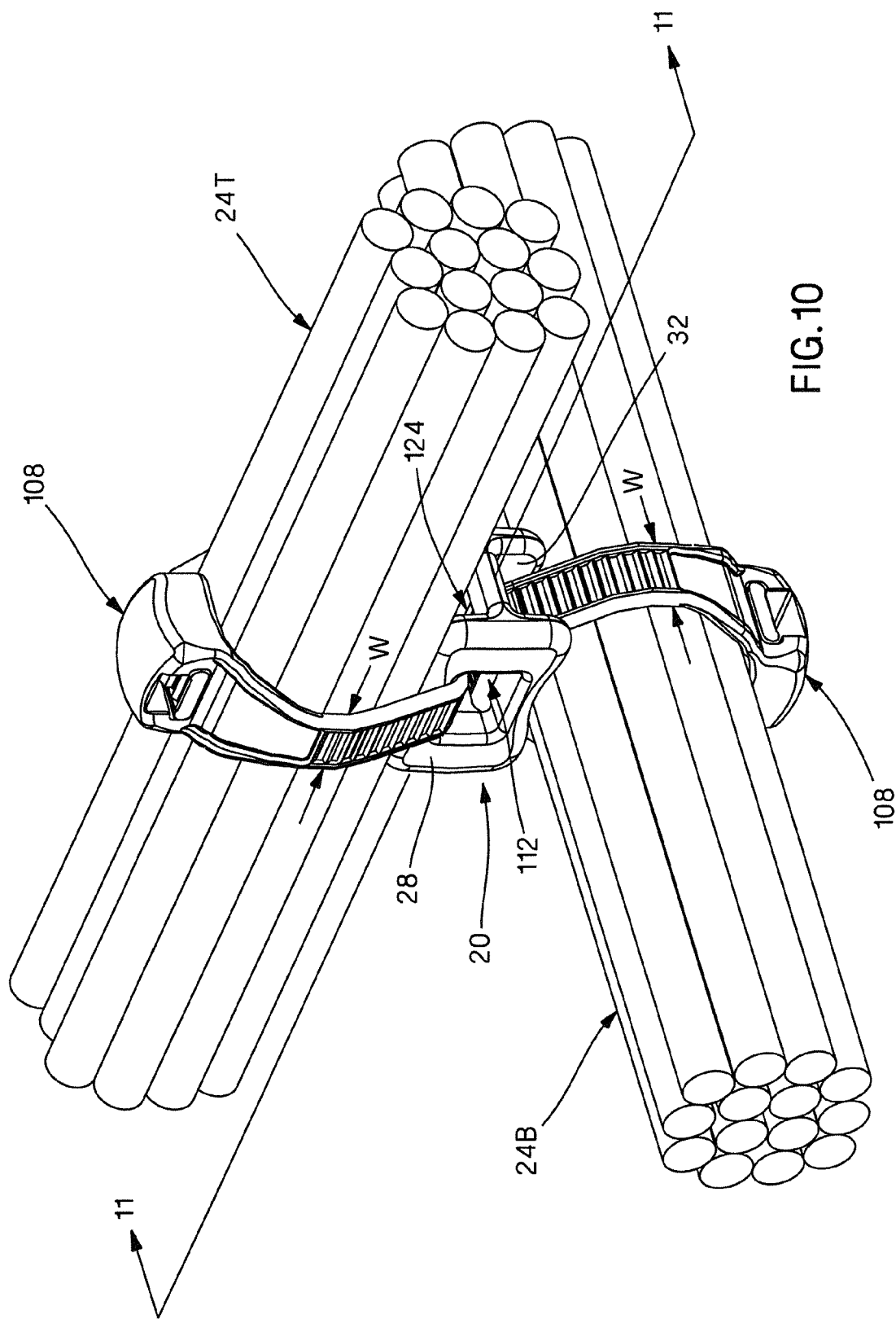
FIG. 10 is a top front perspective view of the bundle spacing device shown in FIG. 1 in a third orientation with a pair of connection members and a pair of bundles.
Figure 11:
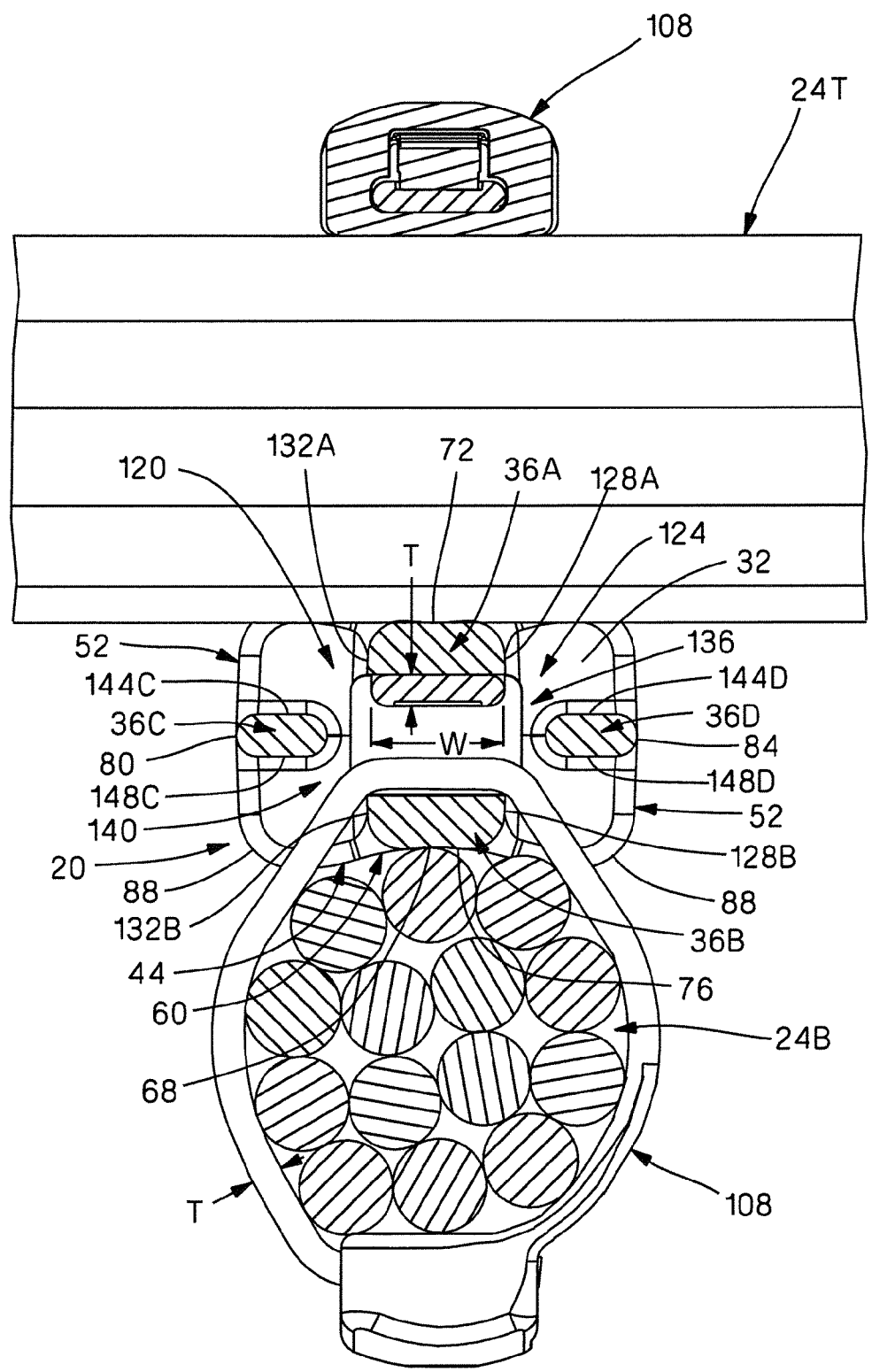
FIG. 11 is a cross-sectional view taken along line 11-11 in FIG. 10.

Referring now to FIGS. 10 and 11, the bundle spacing device 20 is illustrated in a third orientation. In this third orientation, the top and bottom bundles 24T, 24B are positioned perpendicular to one another and the bundle spacing device 20 is positioned with its elongate dimension E1 parallel to the top bundle 24T and perpendicular to the bottom bundle 24B. Alternatively, the bundle spacing device 20 may be positioned with its elongate dimension E1 perpendicular to the top bundle 24T and parallel to the bottom bundle 24B. The top bundle 24T has a portion thereof positioned between first and second walls 28, 32 and engages the outer surface 72 of member 36A extending between the first and second walls 28, 32. As best seen in FIG. 11, the highest portions of the first and second walls 28, 32 extend above the outer surface 72 of member 36A extending between the first and second walls 28, 32. This difference in height provides a saddle in which a portion of the top bundle 24T may be positioned and inhibits the top bundle 24T from sliding or moving off of the top of the bundle spacing device 20. The top connection member 108 wraps around the top bundle 24T and inserts through the first passage 112 of the bundle spacing device 20 to couple the top bundle 24T to the bundle spacing device 20. As indicated above, the first dimension 100 of the first passage 112 is sufficiently wide to allow the top connection member 108 to lie flat against an inside of the first passage 112. The bottom bundle 24B is positioned within and engages the bottom arcuate portions 56, 60 of the first and second walls 28, 32 and the outer surface 76 of member 36B extending between the first and second walls 28, 32. The bottom connection member 108 wraps around the bottom bundle 24B and inserts through the fifth passage 140 of the bundle spacing device 20 to couple the bottom bundle 24B to the bundle spacing device 20.

When the bundles 24 are tightly coupled to the bundle spacing device 20 in this third orientation, the perpendicular running bundles 24 are spaced apart from each other at the second or short dimension S1 of the bundle spacing device 20. Referring back to the example provided above, in this third orientation, the bundles 24 would be spaced apart from each other about 0.25 inches.

Figure 12:
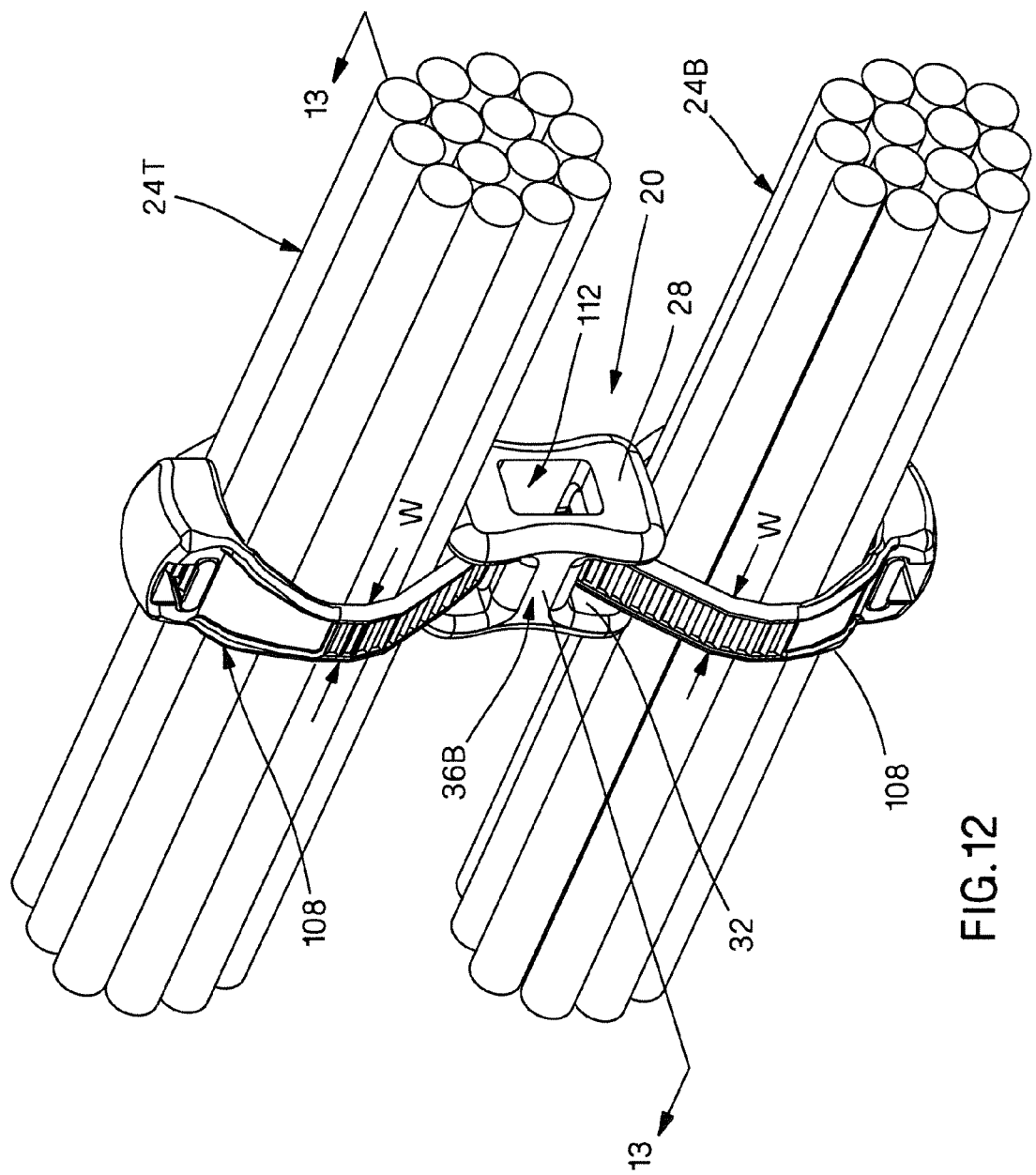
FIG. 12 is a top front perspective view of the bundle spacing device shown in FIG. 1 in a fourth orientation with a pair of connection members and a pair of bundles.
Figure 13:
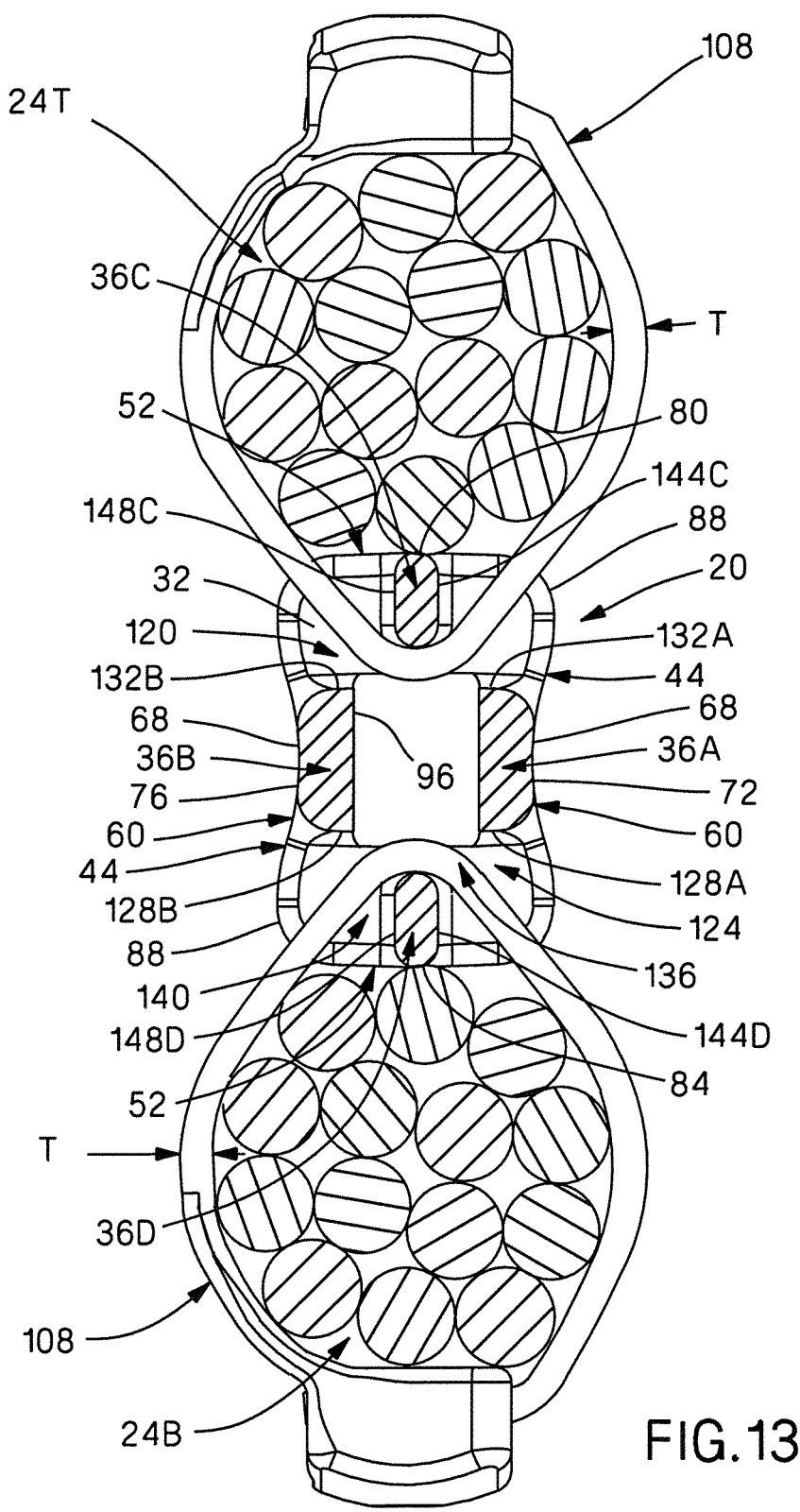
FIG. 13 is a cross-sectional view taken along line 13-13 in FIG. 12.

Referring now to FIGS. 12 and 13, the bundle spacing device 20 is illustrated in a fourth orientation. In this fourth orientation, the top and bottom bundles 24T, 24B are positioned parallel to one another and the bundle spacing device 20 is positioned with its elongate dimension E1 perpendicular to the bundles 24 and intersecting the bundles 24. In addition, the short dimension S1 of the bundle spacing device 20 is perpendicular to the parallel bundles 24. As best illustrated in FIG. 13, the top bundle 24T has a portion thereof engaging the outer surface 80 of the member 36C extending between the first and second walls 28, 32 and may also engage the top short edges 48, 52 of the first and second walls 28, 32. The top connection member 108 wraps around the top bundle 24T and inserts through the second passage 120 of the bundle spacing device 20 to couple the top bundle 24T to the bundle spacing device 20. As best illustrated in FIG. 13, the bottom bundle 24B has a portion thereof engaging the outer surface 84 of the member 36D extending between the first and second walls 28, 32 and may also engage the bottom short edges 48, 52 of the first and second walls 28, 32. The bottom connection member 108 wraps around the bottom bundle 24B and inserts through the third passage 124 of the bundle spacing device 20 to couple the bottom bundle 24B to the bundle spacing device 20.

When the bundles 24 are tightly coupled to the bundle spacing device 20 in this fourth orientation, the parallel running bundles 24 are spaced apart from each other at the first or elongate dimension E1 of the bundle spacing device 20. Referring back to the example provided above, in this fourth orientation, the bundles 24 would be spaced apart from each other about 0.50 inches.

In the illustrated exemplary embodiment, the bundle spacing device 20 is configured to inhibit bundles 24 from coupling to the bundle spacing device 20 with the bundle spacing device 20 rotated ninety-degrees about a vertical axis from the fourth orientation, such that the short dimension S1 of the bundle spacing device 20 is parallel with the bundles 24. Coupling the bundle spacing device 20 to the bundles 24 is inhibited by having the second dimension 104 of the first passage 112 smaller than a width W of the one or more connection members 108. With the second dimension 104 of the first passage 112 smaller than the width W of the one or more connection members 108, a user could insert the connection member 108 into the first passage 112 at an angle, but could not lay the connection member 108 flat against an inner surface of the first passage 112 having the second dimension 104. A user would identify that something was incorrect since the connection member 108 could not be laid flat in the first passage 112 and would understand that the bundle spacing device 20 must be reoriented into another orientation. This also prevents a user from using the bundle spacing device 20 to run bundles perpendicular to each other with the elongate dimension E1 of the bundle spacing device 20 being perpendicular to the bundles 24 and intersecting the bundles 24.

Figure 14:
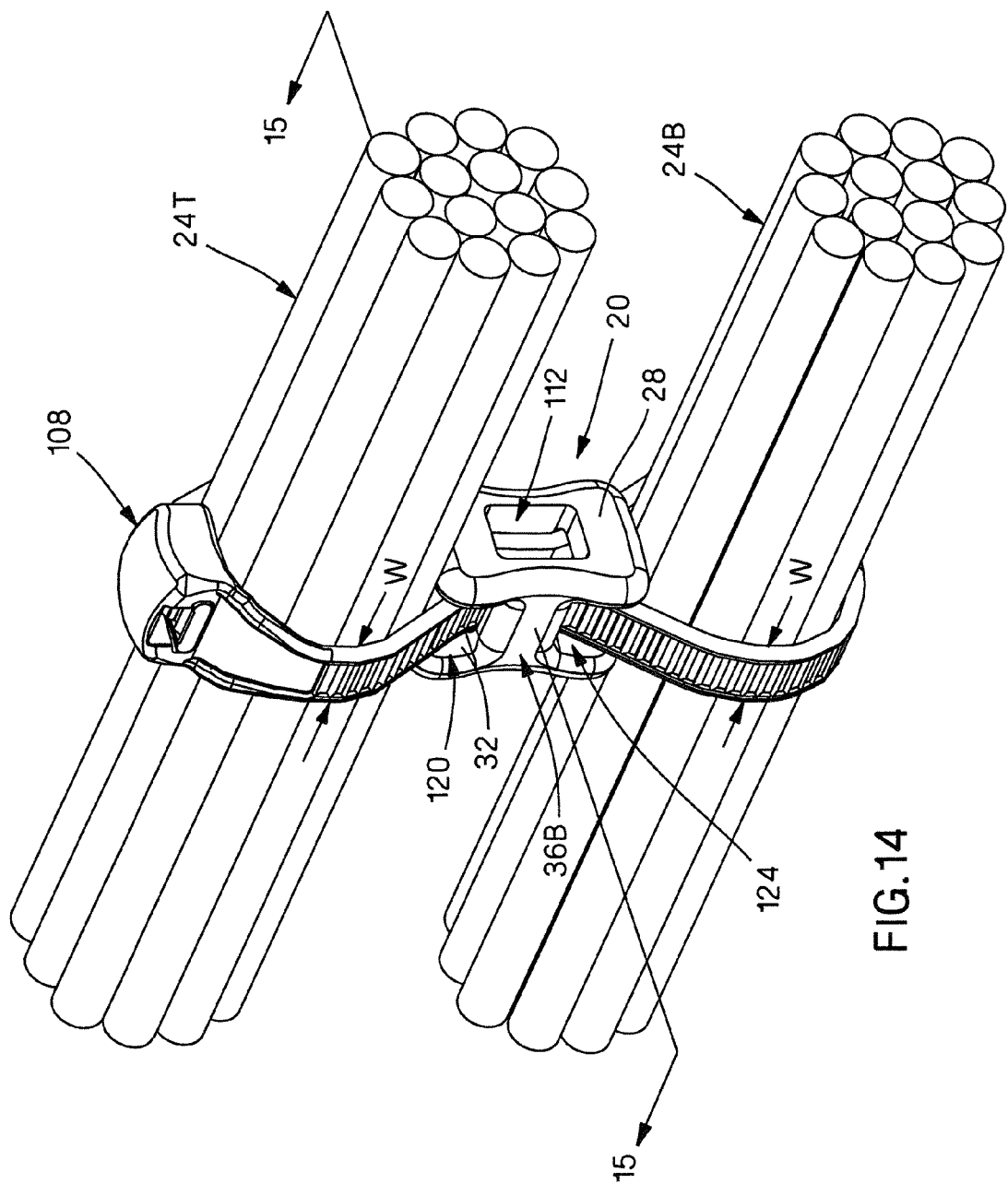
FIG. 14 is a top front perspective view of the bundle spacing device shown in FIG. 1 in the fourth orientation with a connection member and a pair of bundles.
Figure 15:
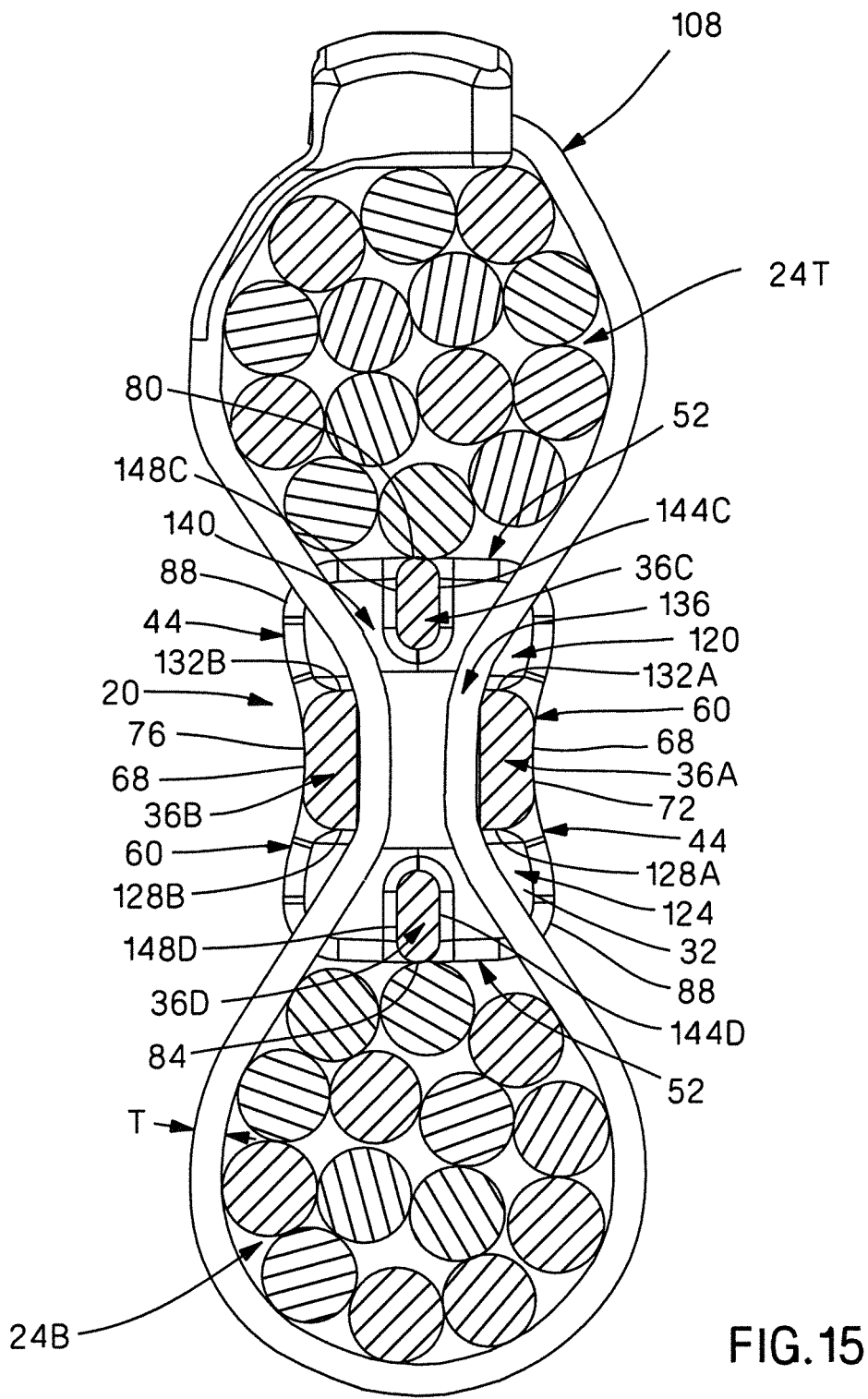
FIG. 15 is a cross-sectional view taken along line 15-15 in FIG. 14.
Figure 16:
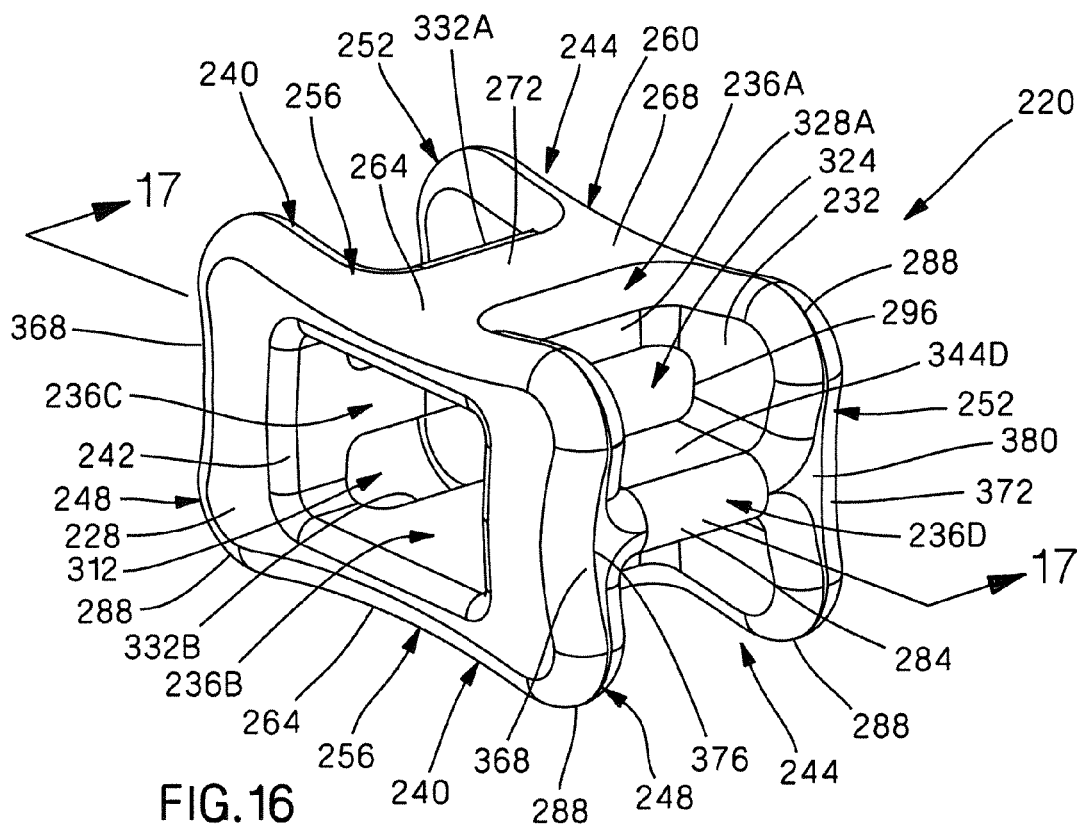
FIG. 16 is a top front perspective view of another exemplary bundle spacing device.
Figure 17:
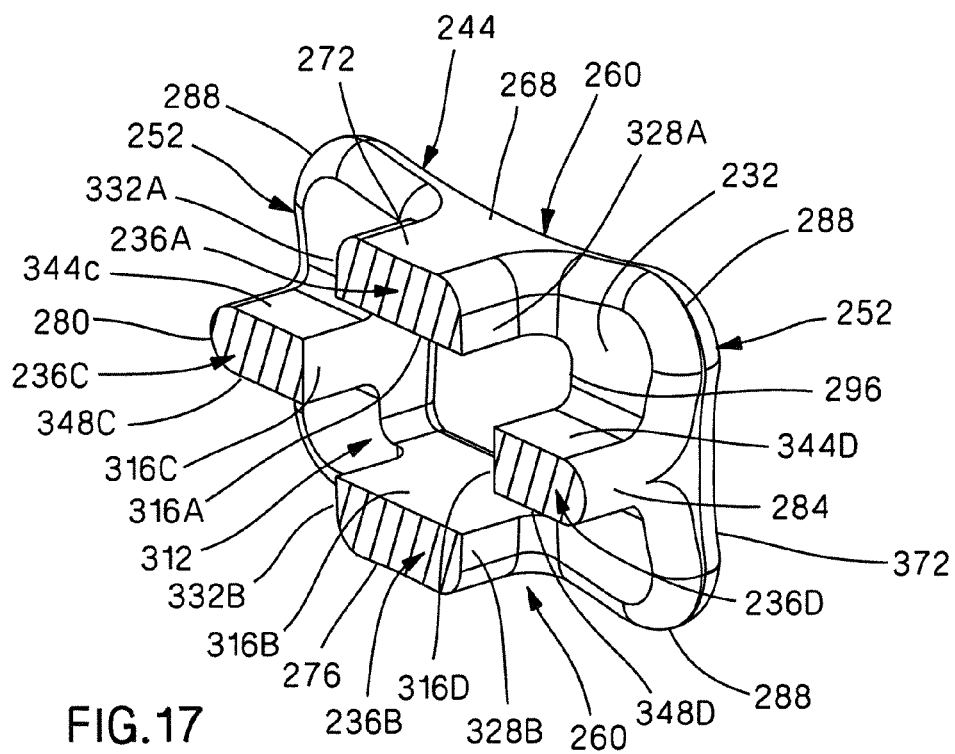
FIG. 17 is a cross-sectional view taken along line 17-17 in FIG. 16.
Figure 18:
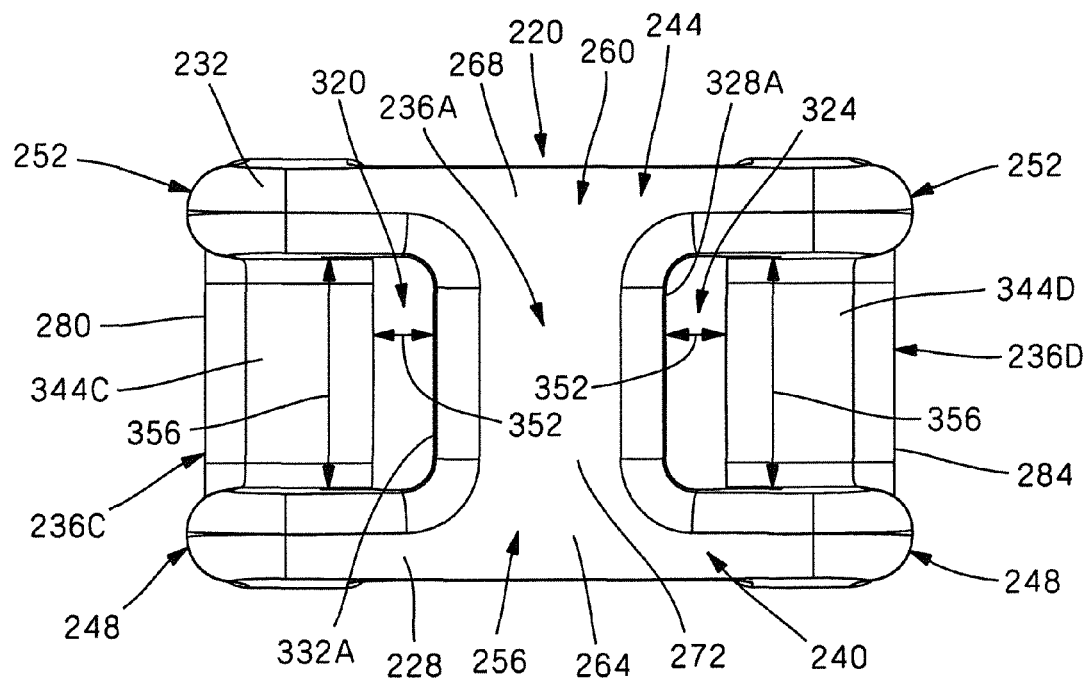
FIG. 18 is a top view of the bundle spacing device shown in FIG. 16.
Figure 19:
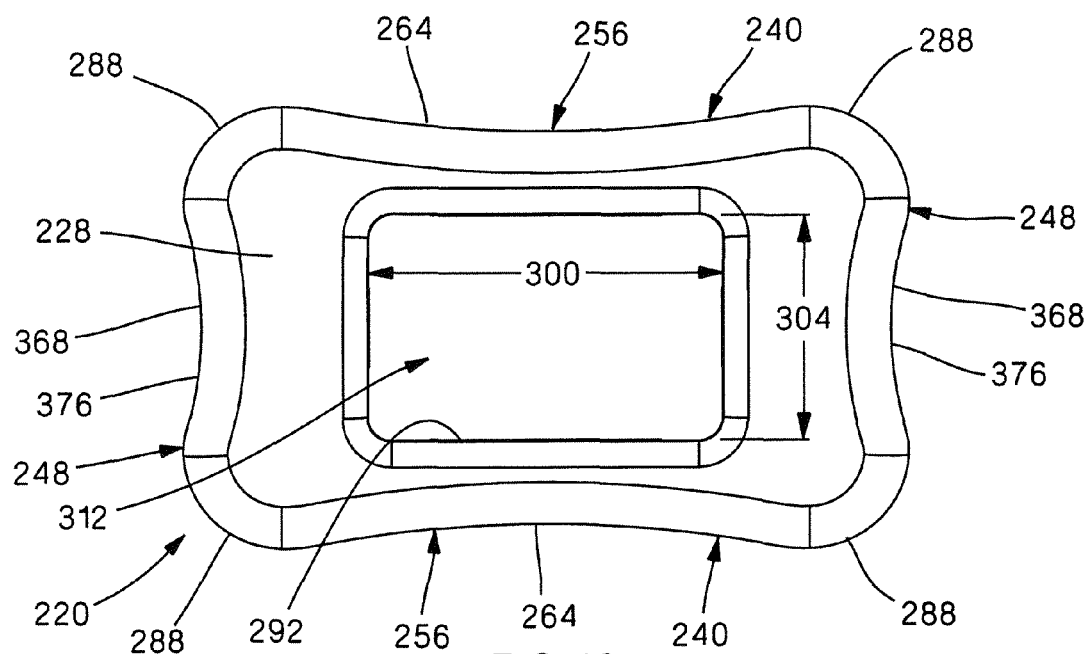
FIG. 19 is a front view of the bundle spacing device shown in FIG. 16.
Figure 20:
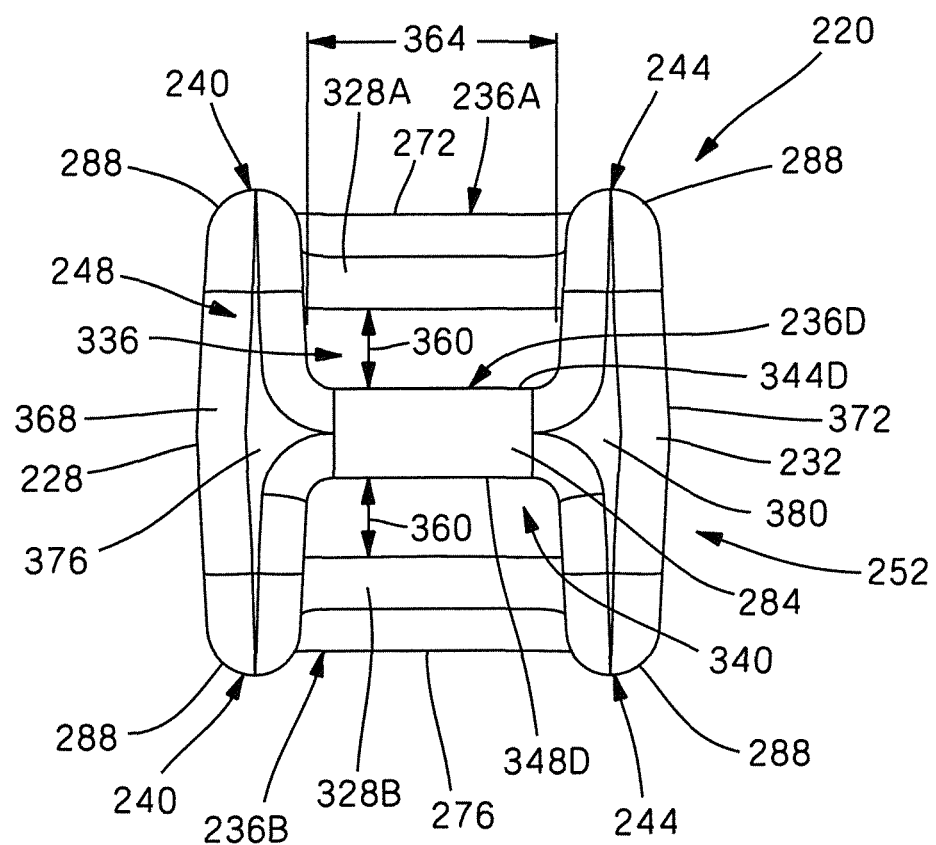
FIG. 20 is a left side view of the bundle spacing device shown in FIG. 16.

Referring now to FIGS. 14 and 15, the bundle spacing device 20 is illustrated in the fourth orientation, which is also illustrated in FIGS. 12 and 13. However, in FIGS. 14 and 15, the parallel bundles 24 are coupled to the bundle spacing device 20 with a single connection member 108. In this configuration, the single connection member 108 wraps around the top bundle 24T, inserts into and through the fourth passage 136, wraps around the bottom bundle 24B, inserts into and through the fifth passage 140, and is tightened to couple the top and bottom bundles 24T, 24B to the bundle spacing device 20.

With reference back to FIG. 6, a single connection member 108 can also be used to couple the top and bottom bundles 24T, 24B to the bundle spacing device 20 in the first orientation. In this configuration, the single connection member wraps around the top bundle 24T, inserts into and through the second passage 120, wraps around the bottom bundle 24B, inserts into and through the third passage 124, and is tightened to couple the top and bottom bundles 24T, 24B to the bundle spacing device 20.

Referring now to FIGS. 16-20, an alternative exemplary embodiment of a bundle spacing device 220 is illustrated. Components of the bundle spacing device 220 illustrated in FIGS. 16-20 are similar to components of the bundle spacing device 20 illustrated in FIGS. 1-15, with the first group of components having a 200 series number and the second group of components (100 series) having a 300 series number.

In the illustrated exemplary embodiment in FIGS. 16-20, the first and second walls 228, 232 of the bundle spacing device 220 each include a pair of opposing short edges 248, 252 and each short edge of the first and second walls 228, 232 includes a convex arcuate portion 368, 372. Bottom or most recessed parts 376, 380 of the convex arcuate portions 368, 372 are substantially aligned with outer surfaces 280, 284 of the adjacent members 236C, 236D extending between the first and second walls 228, 232. That is, as shown in FIGS. 16-20, bottoms 376, 380 of the arcuate portions 368, 372 of the right short edges 248, 252 of the first and second walls 228, 232 are aligned with the outer surface 280 of the member 236C extending between right sides of the first and second walls 228, 232. In addition, as shown in FIGS. 16-20, bottoms 376, 380 of the arcuate portions 368, 372 of the left short edges 248, 252 of the first and second walls 228, 232 are aligned with the outer surface 284 of the member 236D extending between left sides of the first and second walls 228, 232.

In this illustrated embodiment, the arcuate short edges 248, 252 of the first and second walls 228, 232 function in a similar manner to the arcuate elongate edges 240, 244 of the first and second walls 228, 232. More particularly, the arcuate portions 368, 372 of the short edges 248, 252 of the first and second walls 228, 232 act as saddles to assist with coupling of the bundles 24 to bundle spacing device 220 and help retain the bundles 24 in contact with the short edges 248, 252 of the bundle spacing device 220 by resisting sliding or moving of the bundles 24 along the short edges 248, 252 of the bundle spacing device 220.

The bundle spacing device 220 illustrated in FIGS. 16-20 may be used in all the same orientations of the bundle spacing device 220 illustrated in FIGS. 1-15. The particular orientation in which the arcuate short edges 248, 252 will engage bundles 24 is the fourth orientation (see FIGS. 12 and 13). In this fourth orientation, the top bundle 24T is positioned within and engages the arcuate portions 368, 372 of the short edges 248, 252 of the first and second walls 228, 232 and engages an outer surface 280 of the adjacent member 236C extending between the first and second walls 228, 232. The top connection member 108 wraps around the top bundle 24T and inserts through the second passage 320 of the bundle spacing device 220 to couple the top bundle 24T to the bundle spacing device 220. The bottom bundle 24B is positioned within and engages the arcuate portions 368, 372 of the short edges 248, 252 of the first and second walls 228, 232 and engages an outer surface 284 of the adjacent member 236D extending between the first and second walls 228, 232. The bottom connection member 108 wraps around the bottom bundle 24B and inserts through the third passage 324 of the bundle spacing device 220 to couple the bottom bundle 24B to the bundle spacing device 220.

When the bundles 24 are tightly coupled to the bundle spacing device 220 in this fourth orientation, the parallel running bundles 24 are spaced apart from each other at the first or elongate dimension E1 of the bundle spacing device 220. Referring back to the example provided above, in this fourth orientation, the bundles 24 would be spaced apart from each other about 0.50 inches.

It should be understood that the bundle spacing devices described herein and illustrated in the figures may have configurations different than those described and illustrated and such different configurations are intended to be within the spirit and scope of the present invention. For example, the elongate edges of the first and second walls may be substantially flat rather than arcuate or saddled as described above and illustrated in the figures. Substantially flat elongate edges of the first and second walls are sufficient to retain the bundles 24 to the bundle spacing device and inhibit the bundles from sliding or moving off of the bundle spacing device.

The foregoing description has been presented for purposes of illustration and description, and is not intended to be exhaustive or to limit the invention to the precise form disclosed. The descriptions were selected to explain the principles of the invention and their practical application to enable others skilled in the art to utilize the invention in various embodiments and various modifications as are suited to the particular use contemplated. Although particular constructions of the present invention have been shown and described, other alternative constructions will be apparent to those skilled in the art and are within the intended scope of the present invention.

The invention claimed is:

1. A bundling device, comprising:
a bundle spacing device and a connection member;
wherein the bundle spacing device comprising a first passage extending along a first axis;
a second passage extending along a second axis that is perpendicular to the first axis; and
a third passage extending along a third axis that is perpendicular to the first axis and parallel to the second axis;
wherein the first passage, the second passage, and the third passage are each configured to receive the connection member therethrough;
wherein the first passage has a shape and size such that the connection member can be received therethrough in a first position and the connection member is inhibited from being received therethrough in a second position, perpendicular to the first position; and
wherein the first, second, and third passages have a first dimension that is equal to or larger than a width of the connection member and the second and third passages have a second dimension, perpendicular to the first dimension, that is less than a thickness of the connection member.

2. The bundle spacing device of claim 1, wherein the second passage and the third passage have a shape and size such that only one connection member can be received therein.

3. A bundle spacing device, comprising:
a first passage extending along a first axis;
a second passage extending along a second axis that is perpendicular to the first axis;
a third passage extending along a third axis that is perpendicular to the first axis and parallel to the second axis;
a fourth passage extending generally perpendicular to the second axis;
a fifth passage extending generally perpendicular to the third axis;
a first substantially planar wall;
a second substantially planar wall, spaced apart from and substantially parallel to the first wall;
a plurality of members extending between and interconnecting the first wall and the second wall;
the first passage is defined by apertures through the first wall and the second wall;
the second passage is defined by inner surfaces of the first wall and the second wall, an inside surface of one of the members, and side surfaces of other members; and
the third passage is defined by inner surfaces of the first wall and the second wall, a side surface of one of the members, and an inner surface of one of the other members.

4. The bundle spacing device of claim 3, wherein the second passage and the third passage have a shape and size such that only one connection member can be received therein.

5. The bundle spacing device of claim 3, wherein the fourth passage and the fifth passage have a shape and size such that only one connection member can be received therein.

6. A bundle spacing device comprising:
a first wall, the first wall includes a pair of opposing elongate edges and a pair of opposing short edges, wherein the pair of opposing elongate edges are spaced apart a first distance and the pair of opposing short edges are spaced apart a second distance greater than the first distance;
a second wall spaced apart from and generally parallel to the first wall, the second wall includes a pair of opposing elongate edges and a pair of opposing short edges, wherein the pair of opposing elongate edges of the second wall are spaced apart the first distance and the pair of opposing short edges of the second wall are spaced apart the second distance;
a plurality of spaced apart members extending between and engaging the first and second walls at a center of the opposing elongate edges and at a center of the opposing short edges;
wherein the first wall, the second wall, and the plurality of spaced apart members define at least one passage through the bundle spacing device that is configured to receive a connection member therethrough; and
wherein at least two of the plurality of spaced apart members engage the connection member when positioned in the at least one passage to impart frictional resistance to the connection member.

7. The bundle spacing device of claim 6, wherein elongate edges of the first and second walls all include an arcuate portion.

8. The bundle spacing device of claim 6, wherein the short edges of the first and second walls all include an arcuate portion.

9. The bundle spacing device of claim 6, wherein the bundle spacing device is configured to be coupled to bundles in either a first position or a second position.

\* \* \* \* \*